United States Patent [19]

Ruff et al.

[11] 4,212,755

[45] Jul. 15, 1980

[54] SETTLE RESISTANT LOOSE-FILL PERLITE INSULATION COMPRISING PARTICLES RENDERED SLIGHTLY TACKY BY A COATING THEREON

[75] Inventors: David L. Ruff, Torrance; N. Gokul Nath, Carson, both of Calif.

[73] Assignee: Grefco, Inc., Bala Cynwyd, Pa.

[21] Appl. No.: 875,632

[22] Filed: Feb. 6, 1978

[51] Int. Cl.² .............................................. C04B 43/00
[52] U.S. Cl. .................................... 252/62; 427/215; 427/220; 427/221
[58] Field of Search ................ 252/62; 427/421, 221, 427/220, 215, 212

[56] References Cited

U.S. PATENT DOCUMENTS

| | | | |
|---|---|---|---|
| 2,625,512 | 1/1953 | Powell | 252/62 |
| 2,884,380 | 4/1959 | Cook et al. | 252/62 |
| 3,176,354 | 4/1965 | Blau et al. | 20/101 |
| 3,623,938 | 11/1971 | Jenkins | 252/62 |
| 3,655,564 | 4/1972 | Barrington | 252/62 |

*Primary Examiner*—Harris A. Pitlick
*Attorney, Agent, or Firm*—Brian G. Brunsvold; Stephen L. Peterson; Everett H. Murray, Jr.

[57] ABSTRACT

Thermal insulation of particulate expanded perlite that forms a low density, settle-resistant mass due to the coating of the perlite particles with a material rendering the individual particles slightly tacky.

12 Claims, No Drawings

SETTLE RESISTANT LOOSE-FILL PERLITE INSULATION COMPRISING PARTICLES RENDERED SLIGHTLY TACKY BY A COATING THEREON

BACKGROUND OF THE INVENTION

The present invention relates to particulate loose-fill insulation. More particularly, it relates to an improved particulate thermal insulation formed of expanded perlite having a slightly tacky coating thereon.

The product of the present invention is formed from expanded perlite ore. Perlite ore is a naturally occurring volcanic mineral consisting primarily of silica, alumina and a small amount of water. Exposure of perlite ore to temperatures in the range of 1700° to 2100° F. softens the mineral and causes the water to expand to form a light cellular mineral particle. Due to the low density and low thermal conductivity of expanded perlite, it has found utility as a thermal insulator. Expanded perlite has been incorporated with other insulating materials to form board-like products and it has also been used in its particulate form as loose-fill insulation. The present invention is primarily concerned with the improvement of the properties of particulate expanded perlite when it is used as loose-fill insulation.

One of the major drawbacks to using particulate expanded perlite in such applications is that its bulk density, and hence its thermal conductivity, increases as the particles settle after their initial placement around the article to be insulated.

Particles of expanded perlite have densities of approximately 2 to 10 pounds per cubic foot. When particulate expanded perlite is initially poured into a container, for example, it has a bulk density of approximately 4 pounds per cubic foot. The individual particles, however, have a tendency to settle, which densifies the mass and significantly degrades the effectiveness of the thermal insulation. The fraility of the individual perlite particles also contributes to this problem. Fracture of individual particles causes settling, and the filling of air space among particles with perlite fragments of higher density than the larger unfragmented particles.

U.S. Pat. No. 2,625,512 to Powell attempts to eliminate such a problem by adhering the perlite particles and fragments together into agglomerates by the use of adhesives. The adhesive is applied as a discontinuous film or as droplets on the expanded perlite particles and fragments at high temperatures. The particles and fragments are then impinged to one another while cooling to promote agglomeration into larger particles. At room temperature these larger particles (or agglomerates) are non-tacky and will "flow" as a granular solid for use as loose-fill insulation. This agglomeration is taught to reduce the tendency of the particulate insulation to densify in relation to its initial bulk density by settling to a higher density.

By contrast, the present invention coats expanded perlite particles with a material that renders the particles slightly tacky at room temperature. The particles can still be treated as loose-fill insulation, in that they can flow and conform to whatever containment is given the particles. The slight tackiness, however, prevents the particles from sliding over one another to pack or densify after initial placement. This increases the thermal efficiency of this type of insulation by preventing the degradation of its thermal conductivity by densification due to settling.

Not only does the insulation of the present invention resist settling and densification, but the initial volume of the expanded perlite of the present invention is significantly higher (in some cases up to 100%) than the volume of an identical amount of untreated expanded perlite. In other words, when the loose-fill insulation of the present invention flows into place, the tackiness of the individual particles causes the particles to form a mass having a significantly lower initial bulk density than would be formed from non-tacky particles.

This lower initial bulk density has two major advantages. First, the thermal conductance of the present invention is significantly lower than conventional loose-fill perlite insulation. Second, less perlite is needed to fill a given volume. The lower initial bulk density of the present invention also results in significant cost savings since less expanded perlite is needed to fill the same volume of space to be insulated.

By providing a loose-fill thermal insulation that is initially more thermally effective, the requires less expanded perlite and that is also more resistant to degradation of its thermal efficiency due to settling, the present invention provides a major improvement in expanded perlite loose-fill insulation.

Other advantages of the present invention will be obvious to those skilled in the art, or may be obvious from the detailed description of the invention, or may be apparent from practice of the invention.

SUMMARY OF THE INVENTION

The present invention is a loose-fill thermal insulation of expanded perlite having a slightly tacky coating on its outer surface.

Preferably, the insulation has two coatings on the expanded perlite particles. The first coating is preferably asphalt in an amount comprising 0.5 to 5 weight percent of the insulation. The second coating, placed over the asphalt coating, is a polymer that is slightly tacky at about room temperature. It is preferred that the second coating comprise from 1.0 to 30 weight percent of the insulation.

DETAILED DESCRIPTION OF THE INVENTION

The present invention comprises a novel loose-fill thermal insulation formed primarily from expanded perlite. While the size of the particulate expanded perlite is not known to be critical, in most embodiments of the present invention the particulate perlite has a particle size of −8+325, as measured by passage or retention of the particles through Tyler Standard Sieves. Particular success in forming thermal insulation in accordance with the present invention has been experienced using particulate expanded perlite having a particle size wherein the majority of the particles are in the range of from −20 to 100 as measured by Tyler Standard Sieves.

In one embodiment of the present invention the loose-fill thermal insulation is formed of expanded perlite particles that are rendered slightly tacky at room temperature by having an outer coating thereon.

It is the function of this outer coating to render the particles of expanded perlite tacky and thereby reduce the relative movement of the particles when such particles (and hence the coating thereon) come into contact. The degree of adhesion is not such that the individual particles are strongly adhered to one another. With the particles having the appropriate degree of tackiness, the individual particles will adhere slightly to one another and thereby form a low density, non-settling mass. The mass can easily be reduced to a flowable condition by applying a relatively small force to the mass. This characteristic of the present invention allows the material to be packaged and shipped in containers to the site where the insulation is to be placed. Once at the site, the packages containing the insulation can be opened, and with some agitation or the application of minor force, the tackiness of the particles is overcome and the particles can flow as a granular mass into the space receiving the insulation. When the particles accumulate in this space, they once again come in contact and their tackiness provides a low density mass that resists settling.

The degree of tackiness of the particles is not susceptible to quantification. The degree of tackiness necessary for practice of the invention can readily be determined from the examples given herein as well as from the following teaching.

If the particles are excessively tacky, the bond between contacting particles will be greater than can be overcome by agitation or the application of a minor force to the mass. This has the effect of making handling of such material difficult. Once such a material is produced and packaged, it would be difficult to place the mass into the desired location by pouring. Large agglomerates would be formed that would hinder the flow of smaller particles into the space to be insulated, forming uninsulated voids.

On the other hand, if the particles are not sufficiently tacky, the insulating mass formed from the particles would have an unnecessarily high initial density and would not resist settling to even higher densities.

Preferably, the thermal insulation of the present invention is rendered permanently tacky. While the invention could be operable if the particles were tacky only upon placement in the space to be insulated, this would unnecessarily complicate the invention and no means of obtaining this characteristic are presently known.

In describing the characteristic of tackiness for purposes of this disclosure, it should be understood that the property being discussed is tackiness of the particles, not just the material comprising the outer coating. Therefore, tacky materials applied to the particles are only within the teachings of this disclosure if the particles themselves are rendered tacky by the tacky material comprising the coating.

The property of tackiness is disclosed herein in relation to room temperature but it should be understood that the property of tackiness, not the temperature, is what is significant. The most economic manner of using the present invention is to render the particles permanently tacky at about room temperature. Obviously the composition of the coating can be altered where the insulation is to be tacky at temperatures other than those that could be considered about room temperature.

Particular success in the practice of the present invention has been experienced where the particles are rendered slightly tacky by the application of an acrylic polymer. In such a preferred embodiment, an aqueous dispersion or an emulsion of a self cross-linking acrylic polymer is applied to the expanded perlite. The liquid vehicle for the dispersion or emulsion is then eliminated by drying. The final product preferably has a coating on the expanded perlite particle wherein the coating comprises from 1.0 to 30 weight percent of the thermal insulation.

By treating expanded perlite in such a manner, the initial volume of a mass formed from such material has been measured to be about 62% greater than untreated expanded perlite.

Surprisingly, a pre-treatment of the expanded perlite further increases the volume of a mass formed from the treated particulate material.

In this second embodiment of the invention, the expanded perlite is first coated with asphalt. The asphalt-coated expanded perlite is then coated with a second outer coat comprising the slightly tacky coating essential to all embodiments of the invention.

By direct measurement the coating of the expanded perlite only with asphalt has no appreciable effect on the initial bulk density of a mass formed therefrom. By contrast, the placing of the additional slightly tacky outer coating on the asphalt coated expanded perlite results in volume increases of over 100% over untreated or asphalt-coated expanded perlite. It is not presently known why the expanded perlite that is pre-coated with asphalt is so significantly superior to the other embodiment of the invention not having the asphalt pre-coating.

Preferably, this second embodiment of the invention includes a coating of asphalt comprising from 0.5 to 5.0 weight percent of the thermal insulation. As with the first embodiment of the invention, it is preferred that the slightly tacky polymer coating, which in this second embodiment comprises the outer coating, comprise from 1.0 to 30 weight percent of the thermal insulation. It has been determined, however, that by increasing the amount of asphalt on the expanded perlite particles, the amount of tacky polymer necessary to render the particles appropriately tacky decreases.

The composition of the second coating for this second embodiment of the invention is preferably the same material used to form the slightly tacky coating in the first embodiment. Specifically, it is preferred that the expanded perlite particles having a first coating of asphalt thereon also have an outer coating of an acrylic polymer.

The type of asphalt used to form the initial coating on the expanded perlite is not known to be critical and conventional asphalt emulsions can be used. Particular success has been experienced using an asphalt emulsion containing asphalt having a softening point, as measured by the ring and ball method, of 185° F.

In order to illustrate the several embodiments of the present invention, the following examples were prepared.

EXAMPLE 1

Expanded perlite used in this example had a particle size such that 100% of the particles passed through a Tyler Standard Sieve No. 8 and 100% were retained on a Tyler 325 mesh screen with the majority of the particles greater than 100 mesh and less than 20 mesh. This expanded perlite had a bulk density of about 3.8 pounds per cubic foot. A first portion of this material having a volume of 800 milliliters was sprayed with 12 grams of an aqueous acrylic polymer emulsion having a total solids content of about 60%. The emulsion is known commercially as "Bondmaster K800," a self cross-linking tacky acrylic adhesive product of the National Adhesives Company. The coated perlite was then air dried whereupon the coated perlite was slightly tacky at room temperature, pourable, to form a mass having a volume of about 1300 ml.

EXAMPLE 2

A second 800 ml. portion of the material of Example 1 was first sprayed with an emulsion of asphalt so that the dry perlite was coated with the equivalent of about 3% by weight of asphalt emulsion solids. The asphalt emulsion used in this example contained asphalt having a ring and ball softening point of approximately 185° F. The asphalt coated expanded perlite was then sprayed with 12 grams of the identical aqueous acrylic emulsion used in Example 1. After air drying, the 800 ml. of expanded perlite so treated had a volume, when poured, of about 1650 ml., which did not appreciably decrease due to settling of the particles.

The present invention has been disclosed by a general teaching and by means of specific examples. One skilled in the art may find materials other than those specified that produce equivalent properties. Such equivalents are considered to be within the scope of the invention that is disclosed as well as the following appended claims.

What is claimed is:

1. Loose-fill thermal insulation comprising particles of expanded perlite rendered slightly tacky by a coating thereon.

2. The thermal insulation of claim 1 wherein said coating comprises a self cross-linking acrylic polymer.

3. The thermal insulation of claim 2 wherein said coating comprises from 1.0 to 30 weight percent of said thermal insulation.

4. The thermal insulation of claim 1 wherein said particles of expanded perlite include two coatings, a first coating on said expanded perlite comprising asphalt, said second coating being applied over said first coating, said second coating rendering said particles slightly tacky.

5. The thermal insulation of claim 4 wherein said second coating comprises an acrylic polymer.

6. The thermal insulation of claim 5 wherein said acrylic polymer is self cross-linking.

7. The thermal insulation of claim 4 wherein said second coating is permanently tacky at about room temperature.

8. Loose-fill thermal insulation comprising particles of expanded perlite, said particles including at least two coatings thereon: a first coating comprising asphalt, said asphalt coating comprising 0.5 to 5 weight percent of said insulation; and a second coating over said first coating, said second coating comprising a slightly tacky polymer, said second coating comprising from 1.0 to 30 weight percent of said insulation.

9. The thermal insulation of claim 8 wherein said second coating comprises a self cross-linking acrylic polymer.

10. The thermal insulation of claim 9 wherein said perlite particles have a particle size of −8 +325 Tyler mesh.

11. The thermal insulation of claim 10 wherein a majority of said perlite particles have a particle size of −20 +100 Tyler mesh.

12. The thermal insulation of claim 8 wherein said tacky polymer is permanently tacky at about room temperature.

* * * * *